United States Patent [19]

Tanaka et al.

[11] Patent Number: 5,447,774
[45] Date of Patent: Sep. 5, 1995

[54] COMPOSITE SLIDING MEMBER WITH HIGH POROSITY SINTERING LAYER

[75] Inventors: Tadashi Tanaka, Konan; Hidehiko Tamura; Shigemasa Hakakoshi, both of Aichi; Takahiro Niwa, Konan, all of Japan

[73] Assignee: Daido Metal Company, Ltd., Nagoya, Japan

[21] Appl. No.: 3,605

[22] Filed: Jan. 13, 1993

[30] Foreign Application Priority Data

Jan. 14, 1992 [JP] Japan .................. 4-004550

[51] Int. Cl.6 .................................. B22F 3/26
[52] U.S. Cl. .................................. 428/141; 428/553; 428/546; 428/549; 428/550; 428/551; 428/560; 428/564; 428/596; 428/138; 428/137; 428/135; 428/213; 428/256; 428/463; 428/421; 428/422; 428/325; 428/323; 428/328; 428/327; 252/12.2; 384/913; 384/912; 384/908
[58] Field of Search ............... 428/553, 546, 549, 550, 428/551, 560, 564, 596, 564, 596, 138, 137, 135, 141, 256, 463, 421, 422, 325, 323, 328, 327, 213; 252/12.2; 384/913, 917, 908

[56] References Cited

U.S. PATENT DOCUMENTS

| | | | |
|---|---|---|---|
| 3,705,450 | 12/1972 | Morisaki | 29/182.3 |
| 4,156,049 | 5/1979 | Hodes et al. | 428/409 |
| 4,666,787 | 5/1987 | Bickle et al. | 428/550 |
| 4,847,135 | 7/1989 | Braus et al. | 428/138 |
| 5,091,098 | 2/1992 | Tanaka et al. | 252/12.2 |
| 5,091,308 | 5/1991 | Pratt et al. | 264/87 |
| 5,217,814 | 6/1993 | Kawakami et al. | 428/545 |

FOREIGN PATENT DOCUMENTS

| | | |
|---|---|---|
| 49-13046 | 2/1974 | Japan . |
| 53-02309 | 1/1978 | Japan . |
| 55-106230 | 8/1980 | Japan . |
| 194128 | 11/1984 | Japan . |

*Primary Examiner*—William P. Watkins, III
*Attorney, Agent, or Firm*—Browdy and Neimark

[57] ABSTRACT

There is disclosed a composite slide member which suppresses the exposure of a porous metal layer even when the amount of cutting from a surface of the slide member increases, thereby enhancing an anti-seizing property without adversely affecting a rear resistance. The composite slide member includes a back plate, and a slide layer including a porous metal layer with a porosity of 50% to 80% and a composite synthetic resin composition impregnated and coated in pores of the porous metal layer. The porous metal layer is joined to a surface of the back plate. The porous metal layer is formed by sintering metal powder without applying pressure thereto, and an apparent density of the metal powder is 20% to 40% of its theoretical density. The porous metal and the composite synthetic resin are dispersed on a sliding surface of the slide layer in a substantially mixed condition.

9 Claims, 2 Drawing Sheets

FIG. 2 (CUTTING ALLOWANCE 100μm)
| SURFACE (X50) | KIND | APPARENT DENSITY OF METAL POWDER (g/cm³) | DEGREE OF EXPOSURE OF POROUS METAL (%) |
|---|---|---|---|
| 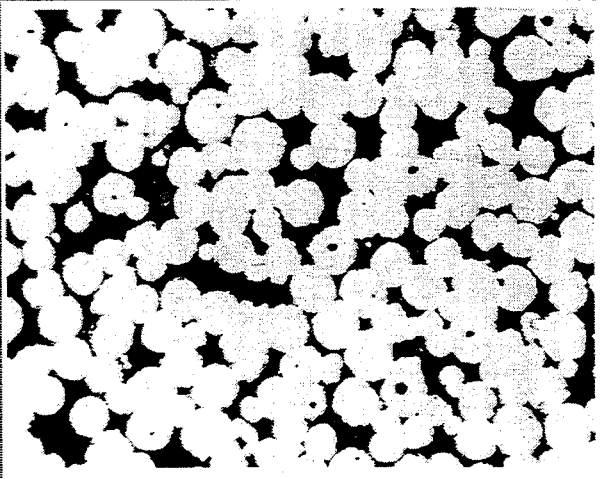 | PRIOR ART | 5.0 | 80 |
| 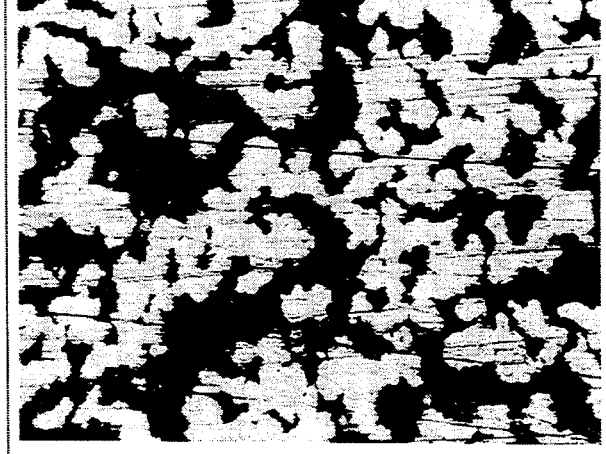 | PRESENT INVENTION | 3.0 | 45 |
| 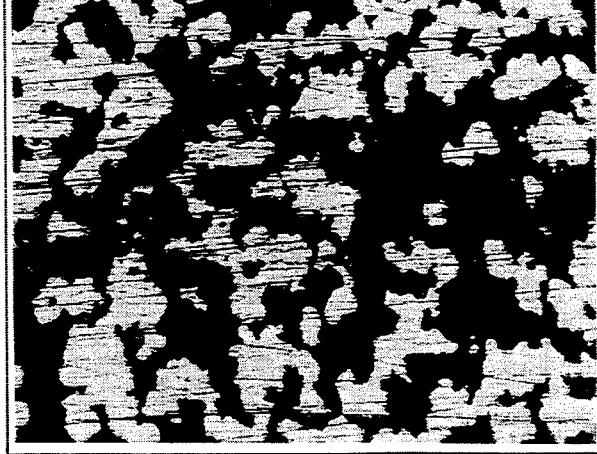 | PRESENT INVENTION | 2.0 | 40 |

COMPOSITE SLIDING MEMBER WITH HIGH POROSITY SINTERING LAYER

BACKGROUND OF THE INVENTION

This invention relates to a composite slide member which exhibits an excellent anti-seizing property under the condition of a boundary lubrication (which means a lubricating condition in which solid contact occurs on projections on a sliding surface, so that wear and seizing are liable to occur) and under the condition of starved lubrication (which means a condition in which solid contact occurs because of an oil shortage, so that wear determines the lifetime).

Conventional slide members used under a boundary lubrication condition and a starved lubrication condition comprise a metal back, a porous metal layer sintered on a surface of the metal back, and an impregnation coating layer which is impregnated into the porous metal layer and is coated on the surface of this porous metal layer. Examples of such an impregnation coating layer composition mixture include polytetrafluoroethylene (hereinafter referred to as "PTFE")-20 vol. % Pb, PTFE-20 vol. % Pb with a large specific surface area, PTFE-10 vol. % tetrafluoroethylen.perfluoroalkyl vinyl ether copolymer (hereinafter referred to as "PFA")-20 vol. % Pb with a large specific surface area.

As disclosed in Japanese Patent Unexamined Publication No. 59-19128, in order to avoid the possibility that the surface layer of such a composite slide member is removed at an initial stage of the operation with the result that a bearing clearance becomes large, machining is beforehand applied to the sliding surface to scatteredly expose both of the porous metal layer and the impregnation coating layer at the sliding surface, and then the composite slide member is used.

In the above prior art, however, when the amount of cutting allowance from the surface of the composite slide member is increased during the machining of this surface, the porous metal layer becomes much exposed abruptly, which has resulted in a problem that the composite slide member becomes seized to its mating shaft under the boundary lubrication condition and/or the starved lubrication condition.

SUMMARY OF THE INVENTION

The present invention seeks to suppress the exposure of a porous metal layer even when the amount of cutting allowance from a surface is increased, and also to keep the exposure of an impregnation synthetic resin layer having an excellent anti-seizing property, without adversely affecting a wear resistance. More specifically, an object of this invention is to provide a composite slide member which exhibits an excellent anti-seizing property without adversely affecting a wear resistance.

In the present invention, it has been found that the above problem can be solved by impregnating a composite synthetic resin in a metal layer having a porosity of 50% to 80% which metal layer is obtained by sintering metal powder having a low apparent density which is 20% to 40% of its theoretical density.

More specifically, according to the present invention, there is provided a composite slide member comprising a metal back; and a slide layer including a porous metal layer with a porosity of 50% to 80% and a composite synthetic resin layer impregnated into the porous metal layer, the porous metal layer being bonded to a surface of the metal back, the porous metal layer being formed by sintering metal powder without applying pressure thereto, an apparent density of the metal powder being 20% to 40% of its theoretical density, and both the porous metal and the composite synthetic resin being in a substantially consistent predetermined mixture state on a sliding surface of the slide layer.

The back metal used here may be made of steel, or any other suitable metal such, for example, as stainless steel and a copper alloy such as bronze. Plating may or may not be provided between the metal back and the porous metal layer, and this plating may be composed of copper, or any other suitable metal, or an alloy of such metal. The porous metal layer formed on the metal back may be composed of a copper alloy, such as bronze and lead bronze, or any other suitable metal, or an alloy of such metal.

In addition to the impregnation coating layer compositions described above in connection with the prior art, other synthetic resins, such as POM (polyacetal), PEEK (polyether ether ketone), PF (phenol), PI (polyimide) and PAI (polyamide imide), can be used a the synthetic resin composition (the impregnation coating layer composition). In order to decrease the friction coefficient, a solid lubricant such as graphite and $MoS_2$ may be added to the above synthetic resin. Further, in order to enhance a wear resistance, a fused fluororesin such as PFA and FEP, a metal oxide, a metal fluoride, a fiber material such as CF, or ceramics powder such as SiC may be added.

In the above composite slide member of the present invention, the apparent density of the metal powder is low, that is, 20% to 40% of the theoretical density, and therefore when this metal powder is sintered, the resultant porous metal layer on the metal back has a high porosity of 50% to 80%. As a result, the amount of filling or impregnation of the composite synthetic resin composition in the pores of this porous metal layer is large, and even when the amount of cutting allowance from the surface increases, the exposure of the porous metal layer is suppressed because of the increased amount of the composite synthetic resin, and also the composite synthetic resin of an excellent anti-seizing property is exposed in a well-balanced manner, thereby preventing the seizing of the composite slide member relative to its mating shaft.

Referring to the reason why the apparent density is limited to 20% to 40% of the theoretical density, if the apparent density is less than 20%, the wear resistance property is extremely affected adversely. On the other hand, if the apparent density is more than 40%, the degree of exposure of the porous metal layer excessively increases as the amount of cutting allowance from the surface increases.

BRIEF DESCRIPTION OF THE DRAWINGS

FIG. 2 is a photograph showing the condition of mixture of porous metal and a composite synthetic resin in a sliding surface in the product of the invention and the prior art product.

PREFERRED EMBODIMENTS OF THE INVENTION

Example 1

Figure 1:
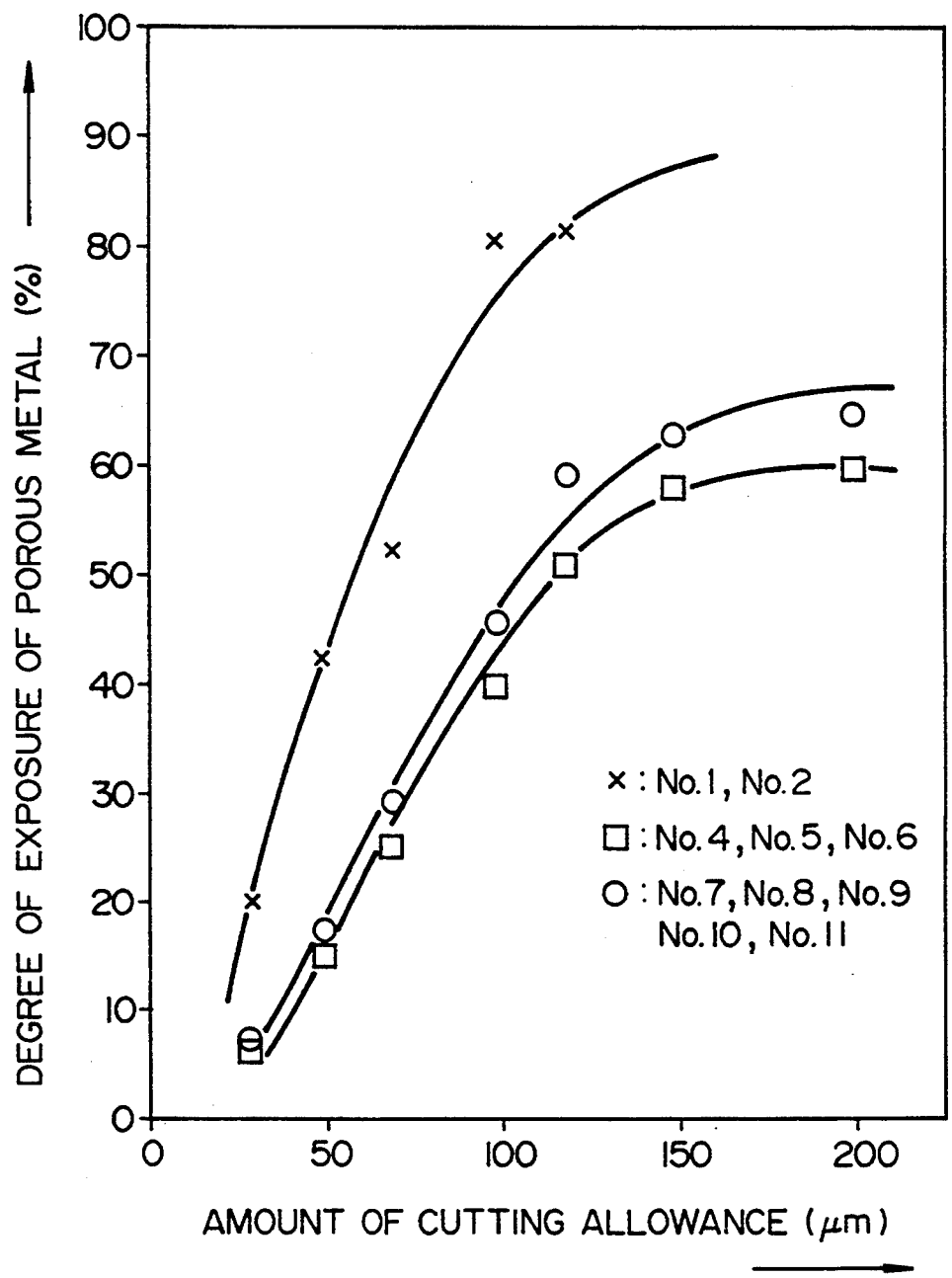
FIG. 1 is a graph showing the degree of exposure of a porous metal layer in products of the invention and products of the prior art.

The present invention will now be described specifically by way of Examples.

Each of metal powders having respective apparent densities (g/cm³: the weight of the powder per unit volume) shown in Table 1 was applied onto a copper-plated steel back (JIS SPCC) (The thickness of this copper plating film was 7 to 10 μm) to form a layer of this bronze or lead bronze powder having a thickness of 0.3 mm. Then, the metal powder layer was sintered into a porous structure within temperatures of 760° to 860° C. for about 10 minutes in a non-oxidizing atmosphere, thus forming a porous sintered layer having a porosity (the ratio, expressed in percent, of the void space in the sintered material to the volume thereof) of 50% to 80%. Then, each of impregnation coating composite synthetic resin materials shown in Sample Nos. 1 to 8 of Table 1 was superposed on the porous sintered metal layer, and they were passed between rolls, thereby impregnating the composite synthetic resin into all of the pores in the porous metal layer. Then, this intermediate product was baked for about 10 minutes within temperatures of 327° C. to 400° C. in an ordinary atmosphere and an oxidizing atmosphere, and then was passed between rolls to have a uniform thickness. In this manner, the prior art products (Sample Nos. 1 to 3) and the products of the invention (Sample Nos. 3 to 8) were prepared (The details are given in Japanese Patent Unexamined Publication Nos. 3-250096 and 3-250097).

Example 2

As described in Example 1, each of impregnation coating composite synthetic resin materials shown in Sample Nos. 9 to 11 of Table 1 was superposed on a porous sintered metal layer with a porosity of 50% to 80%, and they were passed between rolls, thereby impregnating the composite synthetic resin into all of the pores in the porous metal layer. Then, this intermediate product was dried at 100° C., and then was passed between rolls to have a uniform thickness, and then was baked for about 10 minutes at 250° C. In this manner, the products of the invention (Sample Nos. 9 to 11) were prepared.

Further, the surface of each of the above products was cut or machined to produce a bearing.

A surface portion of each of the above products was removed by cutting allowance predetermined, and in this condition, the degree of exposure of the porous metal at each of the composite synthetic resin portion and the metal portion was measured by an image analysis system. Results of this measurement are shown in FIG. 1, where it is seen that for an amount of machining (cutting allowance) of 150–200 μm (0.15–0.2 mm) the amount of metal exposure did not exceed about 65%. FIG. 2 is a photograph showing the state of mixture of the metal and the composite synthetic resin on the surface after the machining. Further results of a sliding test are shown in Table 2, and the conditions of this test are shown in Table 3.

As is clear from FIG. 1, a comparison between the prior art products (Sample Nos. 1 to 3) and the products of the present invention (Sample Nos. 4 to 11) indicates that even when the amount of cutting allowance from the surface increases, the degree of exposure of the metal layer can be suppressed in the products of the invention (Sample Nos. 4 to 11) because the composite synthetic resin is filled in a larger amount.

As will be appreciated from Table 2, the only prior art products (Sample Nos. 1 to 3) which could be used without being seized to the mating shaft were those cut to a depth of 0.05 mm. On the other hand, the products of the present invention (Sample Nos. 4 to 11) could be used without being adversely affected in wear resistance and also without being seized to the mating shaft, and thus the anti-seizing property is markedly enhanced.

The products of the present invention could provide the composite materials which achieve the intended purpose, that is, exhibit an excellent anti-seizing property without adversely affecting the wear resistance.

TABLE 1

| Kind | Sample No. | Apparent density of metal powder (The ratio of apparent density to theoretical density) | Composition of metal powder (wt. %) | Impregnation coating synthetic resin composition (vol. %) |
| --- | --- | --- | --- | --- |
| Prior art | 1 | 5.0 (57%) | Cu-10% Sn | PTFE-20% Pb |
|  | 2 | 5.0 (57%) | Cu-10% Sn-5% Pb | PTFE-20% Pb |
|  | 3 | 5.0 (57%) | Cu-10% Sn | PTFE-10% PFA-20% Pb (Pb has a large specific surface area) |
| Invention | 4 | 2.0 (23%) | Cu-10% Sn | PTFE-20% Pb |
|  | 5 | 2.0 (23%) | Cu-10% Sn-5% Pb | PTFE-20% Pb |
|  | 6 | 2.0 (23%) | Cu-10% Sn | PTFE-10% PFA-20% Pb (Pb has a large specific surface area) |
|  | 7 | 3.0 (34%) | Cu-10% Sn | PTFE-20% Pb |
|  | 8 | 3.0 (34%) | Cu-10% Sn | PTFE-10% PFA-20% Pb (Pb has a large specific surface area) |
|  | 9 | 3.0 (34%) | Cu-10% Sn | PI-30% Graphite |
|  | 10 | 3.0 (34%) | Cu-10% Sn-5% Pb | PAI-30% MoS$_2$ |
|  | 11 | 3.0 (34%) | Cu-10% Sn-5% Pb | PF-40% Graphite |

TABLE 2

| Amount of cutting allowance | Kind | Sample No. | Amount of wear (mm) | Friction Coefficient |
| --- | --- | --- | --- | --- |
| 0.05 mm | Prior Art | 1 | 0.015 | 0.18 |
|  |  | 2 | 0.017 | 0.18 |
|  |  | 3 | 0.013 | 0.15 |
|  | Invention | 4 | 0.016 | 0.11 |
|  |  | 5 | 0.017 | 0.11 |
|  |  | 6 | 0.014 | 0.09 |
|  |  | 7 | 0.015 | 0.12 |
|  |  | 8 | 0.013 | 0.10 |
|  |  | 9 | 0.015 | 0.12 |
|  |  | 10 | 0.014 | 0.13 |
|  |  | 11 | 0.015 | 0.15 |

TABLE 2-continued

| Amount of cutting allowance | Kind | Sample No. | Amount of wear (mm) | Friction Coefficient |
|---|---|---|---|---|
| 0.10 mm | Prior Art | 1 | seizing | — |
| | | 2 | seizing | — |
| | | 3 | seizing | — |
| | | 4 | 0.015 | 0.12 |
| | | 5 | 0.016 | 0.12 |
| | | 6 | 0.013 | 0.10 |
| | | 7 | 0.015 | 0.12 |
| | | 8 | 0.013 | 0.11 |
| | | 9 | 0.015 | 0.12 |
| | | 10 | 0.015 | 0.14 |
| | | 11 | 0.016 | 0.18 |
| 0.15 mm | Prior Art | 1 | seizing | — |
| | | 2 | seizing | — |
| | | 3 | seizing | — |
| | Invention | 4 | 0.010 | 0.16 |
| | | 5 | 0.010 | 0.16 |
| | | 6 | 0.008 | 0.14 |
| | | 7 | 0.009 | 0.15 |
| | | 8 | 0.007 | 0.14 |
| | | 9 | 0.010 | 0.17 |
| | | 10 | 0.009 | 0.17 |
| | | 11 | 0.008 | 0.20 |
| 0.20 mm | Prior Art | 1 | seizing | — |
| | | 2 | seizing | — |
| | | 3 | seizing | — |
| | Invention | 4 | 0.010 | 0.17 |
| | | 5 | 0.010 | 0.17 |
| | | 6 | 0.008 | 0.15 |
| | | 7 | 0.008 | 0.16 |
| | | 8 | 0.007 | 0.15 |
| | | 9 | 0.007 | 0.18 |
| | | 10 | 0.007 | 0.17 |
| | | 11 | 0.007 | 0.21 |

TABLE 3

| Conditions of frictional wear test | |
|---|---|
| Testing machine | Bush testing machine |
| Size of test piece | Inner diameter (20 mm) × outer diameter (23 mm) × length (20 mm) |
| Load | 3 MPa |
| Velocity | 4.0 m/sec |
| Test pattern | operation for 60 sec, Stop for 30 sec (Total: 60 min.) |
| Temperature | Room temperature |
| Lubricant | Kerosine |
| Shaft | |
| Material | S55C |
| Roughness | 1.8 μm Rmax |
| Hardness | 500 to 700 Hv |

What is claimed is:

1. A composite slide member usable in a boundary condition or a starved lubrication condition which occurs due to oil shortage, comprising a backing layer and a slide layer composed of a porous sintered bearing alloy layer with a porosity of 50%–80% impregnated with a composite fluoro-synthetic resin comprising at least 70 vol % of PTFE, said porous sintered bearing alloy layer being bonded to said backing layer, and being formed of un-pressed, sintered bearing alloy powder and having an apparent density of 20%–40% of its theoretical density, said slide layer being formed by machining 0.05 mm to 0.2 mm from an upper surface layer from a machinable slide layer of an intermediate product comprising said backing layer with a machinable slide layer thereon having a thickness greater than 0.2 mm and composed of said porous sintered bearing alloy impregnated with said composite fluoro-synthetic resin.

2. A composite slide member according to claim 1 wherein said machinable slide layer has a thickness of about 0.02 mm.

3. A composite sliding member in accordance with claim 1 wherein said metal backing layer is selected from the group consisting of steel, stainless steel and copper alloy.

4. A composite sliding bearing in accordance with claim 1 wherein said bearing alloy powder is made from a metal selected from the group consisting of bronze and lead bronze.

5. A composite sliding member in accordance with claim 1, wherein said composite fluoro-synthetic resin comprising at least 70 vol % of PTFE further contains at least one member selected from the group consisting of lead, graphite, $MoS_2$, fluororesin other than PTFE, metal oxide, metal fluoride, fiber material and ceramic.

6. An intermediate product in the manufacture of a composite slide member usable in a boundary condition or a starved lubrication condition which occurs due to oil shortage, said intermediate product comprising a back metal optionally with a copper-plated layer; and a machinable slide layer intended to be machined to make a composite slide member, said machinable slide layer including a porous sintered bearing alloy layer with porosity of 50% to 80% and a composite fluoro-synthetic resin containing not less than 70 vol % of PTFE and further containing a member selected from the group consisting of Pb, graphite and $MoS_2$, which composite resin is impregnated in pores of said porous sintered alloy layer, said composite fluoro-synthetic resin being present in an amount sufficient to provide in combination with said porous sintered alloy layer a mixture state bringing about good slide characteristics under conditions of starved lubrication in the slide layer, said porous sintered alloy layer being bonded to the copper-plated layer optionally provided on said back metal, said slide layer being formed by a process comprising the steps of sintering bearing alloy powder which has apparent density of 20% to 40% of its theoretical density and optionally which is placed on the copper-plated layer and without applying pressure to the bearing alloy powder, disposing said composite fluoro-synthetic resin on the sintered bearing alloy powder layer, making both the sintered alloy powder layer and the resin pass a space defined between a pair of rolls so that pores in the sintered bearing alloy layer are filled with the composite fluoro-synthetic resin, and baking the resin-filled sintered bearing alloy layer so that the sintered bearing alloy layer is impregnated with the composite fluoro-synthetic resin, and said mixture state being of a depth and gradient so that a machining of the sintered bearing alloy layer impregnated with the composite fluoro-synthetic resin to a depth not less than 0.05 mm is possible without substantial deviation from said mixture state and without substantial degradation of slide characteristics.

7. An intermediate product as set forth in claim 6, wherein said bearing alloy powder is made of a member selected from the group consisting of bronze and lead bronze.

8. An intermediate product set forth in claim 6, wherein the composite fluoro-synthetic resin containing at least 70 vol % PTFE impregnated in said pores further contains at least one member selected from the group consisting of fluoro-resin other than PTFE, metal oxide, metal fluoride, fiber material and ceramic.

9. An intermediate product according to claim 6, wherein said machinable slide layer has a thickness of about 0.02 mm.

* * * * *